Patented Aug. 7, 1923.

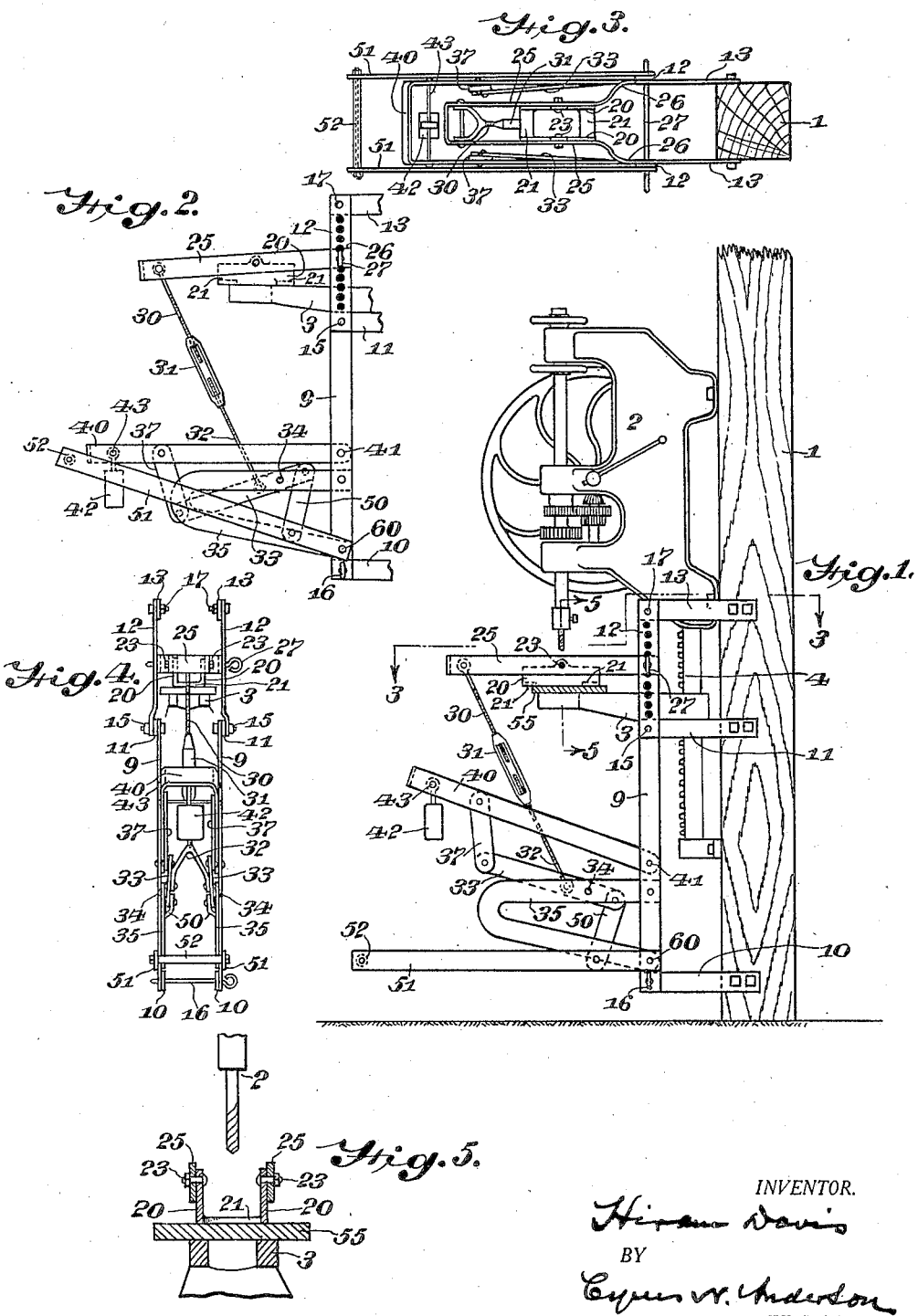

1,464,064

UNITED STATES PATENT OFFICE.

HIRAM DAVIS, OF CAMDEN, NEW JERSEY.

WORKHOLDER.

Application filed April 27, 1921. Serial No. 464,977.

*To all whom it may concern:*

Be it known that I, HIRAM DAVIS, a citizen of the United States, and a resident of Camden, in the county of Camden and State of New Jersey, have invented an Improvement in Workholders, of which the following is a specification.

My invention relates to work holders and it has for its object generally to provide a holder which is adapted for firmly and securely holding work upon a stationary rest while the said work is being operated upon. The said holder is particularly well adapted for holding work upon a work support or rest of a drill press or the like, but it is not restricted in its use to the holding of work to be operated upon by any particular machine.

A further object of my invention is to provide a work holder with holding or clamp means which is adapted to be adjusted to accommodate work of different dimensions and of different shapes.

Another object of my invention is to provide means whereby, when the work is placed in position upon its support, the holding or clamping means is automatically applied, upon the release of the controlling member of the holder, to the work to hold it firmly in position while it is being operated upon.

A still further object of my invention is to provide a compound lever structure by the employment of which a relatively small force, as that of a weight, may be increased at its point of application to such an extent that it will firmly hold the work to which it is applied in fixed position while it is being operated upon by a tool of any kind.

Other objects and advantages of my invention will be pointed out in the detailed description thereof which follows or will be apparent from such description.

In order that my invention may be more readily understood and its practical advantages fully appreciated, reference may be had to the accompanying drawing in which I have illustrated one form of mechanical embodiment thereof. However, it will be understood that my invention is susceptible of embodiment in other forms of construction than that shown and that changes in the details of construction may be made within the scope of the claims without departing from the said invention.

In the drawing:—

Fig. 1 is a view in side elevation of a work holder embodying my invention and of a portion of a drill press with which the said holder is associated or combined, and also showing work in clamped position ready to be operated upon by the said press;

Fig. 2 is a view in side elevation of a portion of the work holder, but showing the operating and clamping levers in different positions, and the work having been removed from between the clamp and the work support;

Fig. 3 is a view taken on the line 3—3 of Fig. 1, the drill press being removed and the work holding means being shown in top plan;

Fig. 4 is a front elevational view of the work holder looking toward the right in Fig. 1; and Fig. 5 is a view taken on the line 5—5 of Fig. 1.

Referring to the drawings:—1 designates a support for the drill press 2 and the work support 3 which is commonly or usually provided for supporting the work to be operated upon by the press. The work support 3 is vertically adjustable in known manner upon the vertical rack 4 which depends from the rear side of the drill press 2.

Referring now to the work holding means which is adapted to cooperate with the work support 3 of a drill press or other like machine, 9 designates vertical side bars which are supported upon the forward outer ends of the bracket-like bars 10 and 11 which are secured to the post 1. The side bars 9 are in alinement with extension side bars 12 the lower ends of which are secured to the upper bracket-like bars 11, while the upper ends thereof are secured to bracket-like bars 13 which are also secured to the post 1. The side bars 9 and 12 are formed separately and are connected by the bolts 15 and are also connected to the outer ends of the brackets 11. If desired the side bars 9 and 12 may be combined in a single bar extending from the bracket-like bar 10 to the similar brackets 13. The lower ends of the side bars 9 are secured to the supporting brackets 10 by means of a pin 16. The upper ends of the side bars 12 are secured to the outer forward ends of the brackets 13 by means of bolts 17. The work holding clamp comprises the vertical sides 20 which are connected at their opposite ends and at their lower edges by cross pieces or cross bars 21 which leave the space intermediate the sides 20 and the connecting bars 21 open. The upper edges of the sides 20 are pivotally connected by means of bolts 23 to the opposite sides of a bent member 25 comprising opposite substantially parallel side portions, as indicated in Fig. 3, the side portions having their inner ends, as indicated at 26, flared outwardly and pivotally connected to the side bars 12 by means of a removable pin 27. By reason of the pivotal connection of the clamping member to the clamp carrying lever 25 the said clamp is adapted to adjust itself to work of different shapes or configurations. The inner ends of the opposite sides of the lever 25 are adapted to be connected at different points along the opposite side bars 12. Such adjustment may be effected by removing the pin 27 and then moving the inner ends of the sides of the said lever 25 up or down as may be desired so as to vary the position of the said clamp carrying lever 25 and of the clamp carried thereby.

The clamp carrying lever 25 is connected by means of a rod 30, a turn buckle 31, and a bifurcated member 32 to levers 33 which are connected respectively at 34 to the angular supporting member 35. The lower ends of the bifurcations of the part 32 are connected to the levers 33 at points in front of the pivots 34. The forward ends of the levers 33 are connected by means of links 37 to the forward portion of a U-shaped lever 40, the inner ends of the opposite sides of the said U-shaped member being pivotally connected at 41 to the side frame bars 9. A weight 42 is pivotally supported upon a pivot 43 situated adjacent the outer end of the said U-shaped member 40. The rear ends of the levers 33 in rear of their pivots 34 are pivotally connected to the upper ends of links 50, the lower ends of which are connected to a frame comprising the opposite side bars 51, the outer ends of which are connected by a bolt or rod having a sleeve thereon, the said bolt or rod and sleeve being designated by the reference number 52.

In the construction as shown in Fig. 1 a piece of work 55 is shown in place upon the work support 3, the said work being clamped upon the upper face or side of the said work support by the clamp 20 carried by the clamp supporting lever 25.

In the construction as shown the work illustrated consists of a relatively thin plate, but it will be understood that the clamp is adapted to hold work either thinner or thicker than that shown and also of different shapes and sizes. For instance, the clamp will hold the work in position to be operated upon by the drill of the drill press even though it be cylindrical.

As stated, the work holding device is adapted for use for holding work of different sizes. It is obvious that by removing the pins 27 the clamp holding lever 25 may be adjusted upwardly if it is desired to accommodate work thicker than that shown in the drawing, or if desired, it may be adjusted downwardly. Also the length of the connection between the clamp holding lever 25 and the levers 33 may be adjusted by means of the turn buckle 31. By means of the said turn buckle the said connection may be either shortened or lengthened.

In case it is desired to release the clamp 20 from the work 55 such release may be accomplished by moving down the outer end portion of the frame comprising the sides 51 which turn about their pivots 60 by means of which they are connected to the lower ends of the side bars 9. Such movement of this frame causes downward movement of the links 50 which effects pivotal movement of the levers 33, throwing the outer forward ends thereof upwardly, which movement acts through the connection between the said levers and the clamp supporting lever 25 to raise the latter so as to remove the clamp 20 from the work 55. Upon release of the frame comprising the side members 51 the weight 42, which was raised at the time the outer end of the said frame was depressed, moves downwardly and acts through the links 37, the levers 33 and the connection between the said levers 33 and the clamp carrying lever 25 to cause downward movement of the said lever 25 and the work clamp carried thereby. It follows that any work which may be present upon the work support or rest 3 is clamped and held tightly and may be operated upon either by the drill of a drill press or the cutting or operating member of any other kind of machine. Also the said clamp would hold the work during the period that any manual operations were being performed upon the same.

It will be seen that I have provided a construction of work holding means which is of practically universal application in that it is capable of being adjusted so as to accommodate itself to and clamp and hold work of different sizes and shapes or configurations while the same is being operated upon.

Having thus described my invention what I claim and desire to secure by Letters Patent is:—

1. In a work holder, the combination of a work support, a clamp adapted to clamp and hold work upon said support, a lever situated a distance from the said clamp the said lever being pivotally supported at a point intermediate its ends, a rod operatively connecting said lever with the said clamp, the said rod having connection at one end with the said lever at a point a distance from its pivot support, a second lever pivoted at one end and having a weight at its other, a link connecting one end of the first named lever with the said second named lever at a point intermediate the ends of the latter, and a third lever pivotally supported at its rear end and situated a distance from the first named lever and upon the opposite side thereof from the second named lever, a link connecting the opposite end of the first named lever to the third named lever at a point intermediate the ends of the latter, substantially as described.

2. In a work holder, the combination of a lever pivotally supported at its rear end, the said lever being free to swing about its pivot, and being provided with clamping means, a lever pivoted intermediate its ends and situated a distance below and in general parallel relation to the clamp carrying lever, a third lever pivotally supported at its rear end, the said lever being free to swing about its pivot and the outer end of said lever carrying a weight, a link connecting the front end of the second named lever with the third named lever at a point between the pivoted end of said lever and the point of attachment of the said weight thereto, a fourth lever pivotally supported at its rear end and situated a distance from the said second lever and upon the opposite side thereof from the said third lever, a link connecting the rear end of the said second lever to the said fourth lever at a point intermediate the ends of the latter and an adjustable rod connecting the outer end portion of said clamp carrying lever and the said second lever, the point of connection of the said rod to the latter lever being intermediate its pivot and the front end thereof.

3. In a work holder, the combination of a vertically adjustable work support a vertically adjustable lever pivoted at its rear end, a work holding clamp having pivotal connection with the said lever, a lever situated a distance from the said clamp carrying lever, means connecting the second named lever with the said clamp carrying lever, means for exerting a continuous force upon the said clamp carrying lever for causing the said clamp to clamp any work which may be present upon the said support and means for exerting a counter force to elevate the said clamp from the said work.

In testimony that I claim the foregoing as my invention, I have hereunto set my name this thirteenth day of April 1921.

HIRAM DAVIS.